United States Patent [19]
Schirmer

[11] Patent Number: 4,606,922
[45] Date of Patent: Aug. 19, 1986

[54] COOK-IN MEAT PACKAGING

[75] Inventor: Henry G. Schirmer, Spartanburg, S.C.

[73] Assignee: W. R. Grace & Co., Cryovac Div., Duncan, S.C.

[21] Appl. No.: 485,323

[22] Filed: Apr. 21, 1983

[51] Int. Cl.$^4$ ............................................. B65B 29/08
[52] U.S. Cl. ................................... 426/412; 426/113; 426/129; 426/415; 204/157.15; 428/35; 156/272.2; 156/273.3
[58] Field of Search ............... 426/412, 415, 129, 127, 426/410, 113, 234; 156/273.3, 272.2, 274.4, 272.6; 204/157.1 H, 158 HE

[56] References Cited

U.S. PATENT DOCUMENTS

| | | |
|---|---|---|
| 3,355,319 | 11/1967 | Rees . |
| 3,567,539 | 3/1971 | Schirmer . |
| 3,607,505 | 9/1971 | Schirmer . |
| 3,741,253 | 6/1973 | Brax . |
| 3,743,521 | 7/1973 | Rasmussen . |
| 3,784,711 | 1/1974 | Kane . |
| 3,997,383 | 12/1976 | Bieler et al. . |
| 4,087,587 | 5/1978 | Shida et al. . |
| 4,087,588 | 5/1978 | Shida et al. . |
| 4,104,404 | 8/1978 | Bieler . |
| 4,211,596 | 7/1980 | Lustig . |
| 4,233,367 | 11/1980 | Ticknor . |
| 4,284,458 | 8/1981 | Schirmer . |
| 4,382,513 | 5/1983 | Schirmer et al. . |
| 4,411,919 | 10/1983 | Thompson ..................... 426/129 |
| 4,448,792 | 5/1984 | Schirmer . |

FOREIGN PATENT DOCUMENTS 2035198 6/1980 United Kingdom .
1587621 4/1981 United Kingdom .

OTHER PUBLICATIONS

Modern Packaging Encyclopedia 1971, 7/71 vol. 44 #7A, McGraw Hill p. 129 plus.
Principles of Package Development, Griffin et al. 1972, AVI Publ. Co. pp. 44, 45.
Condensed Chem. Dict., Hawley Van Nostrand, 1971.

Primary Examiner—Steven Weinstein
Attorney, Agent, or Firm—John J. Toney; William D. Lee, Jr.; Mark B. Quatt

[57] ABSTRACT

A method is provided for enhancing yield of a cook-in packaged meat product that includes first providing an adhering cook-in container including a flexible thermoplastic envelope being substantially conformable to a contained meat product and having an inner surface of a selectively irradiated ionomer of a metal salt neutralized copolymer of ethylene and acrylic acid or methacrylic acid, then conforming the container about a selected meat product and cooking the packaged product, whereupon the inner surface of the envelope bonds to the meat product to substantially prevent cook-out of fluids. An associated cook-in container is also provided.

8 Claims, No Drawings

COOK-IN MEAT PACKAGING

BACKGROUND OF THE INVENTION

This invention relates generally to thermoplastic packaging films suitable for cook-in packaging and their use. More particularly, this invention relates to cook-in food packages having food contact surface characteristics which promote binding adherence to a contained food product during cook-in.

Many foods during preprocessing are stuffed into a casing and then placed in a heated medium, such as a hot water bath, for cook-in to produce a precooked, encased food product. The term "cook-in" conventionally refers to cooking of a food product while contained in a package. Alternatively, the package may be a heat-shrinkable bag which shrinks tightly about a contained food product upon initial exposure to cook-in conditions.

The term "cook-in package" is intended to refer to packaging material structurally capable of withstanding exposure to cook-in time-temperature conditions while containing a food product. Cook-in time-temperature conditions typically imply a long slow cook, for example by submersion in water at 70°–80° C. for 4–6 hours. Under such conditions, a packaging material properly characterized as cook-in will maintain heat seal integrity and will be delamination resistant.

It is desirable that a cook-in package closely conform to the contained food product to prevent "cook-out", i.e. exudation of fluids from the food product during cooking. By restricting exudation of fluids from a cook-in contained food product, the yield of the precooked food product is increased, since fluid retention tends to increase product weight.

Of general interest is the disclosure of U.S. Pat. No. 3,743,521 issued July 3, 1973 to Rasmussen for "Coated Fibrous Sausage Casing" directed to a fibrous casing having an internal coating of a cationic thermosetting resin to inhibit the accumulation of fat and gelatin between the casing and a contained sausage product.

Of general interest in the disclosure of U.S. Pat. No. 3,784,711 issued Jan. 8, 1974 to Kane for "Surface Treated Cheese Package and Method" directed to a package of cheese overwrapped in polyester film having a corona treated inner surface to promote adhesion to molten cheese.

Of general interest is the disclosure of U.S. Pat. No. 3,355,319 issued Nov. 28, 1967 to Rees for "Self-Supporting Film With A Heat-Sealable Coating of An Ionic Copolymer Of An Olefin And Carboxylic Acid With Metal Ions Distributed Throughout" directed to a thermoplastic film structure having a heat-sealable coating of an ionic copolymer.

Of general interest is the disclosure of U.S. Pat. No. 4,104,404 issued Aug. 1, 1978 to Bieler et al for "Crosslinked Amide/Olefin Polymeric Tubular Film Coextruded Laminates" directed to irradiatively cross-linked film having polyamide and polyolefin layers joined by an ionomeric adhesive interlayer.

SUMMARY OF THE INVENTION

The present invention is directed to improved cook-in packaging wherein a cook-in envelope adheres to a contained meat product during cook-in to restrict cook-out of fluids from the meat product thereby increasing product yield. As used herein, the term "adhere" is intended to mean that the food contact surface of the envelope bonds during cook-in to the contained meat product to an extent sufficient to prevent accumulation of fluids between the envelope and the contained product.

Accordingly, there is provided a method for enhancing yield of a cook-in packaged meat product that includes providing an adhering cook-in container characterized as a flexible thermoplastic envelope being substantially conformable to a contained meat product and having an inner surface of an ionomer of a metal salt neutralized copolymer of an olefin and a carboxylic acid, said ionomer having been treated with ionizing radiation to a dosage sufficient to cause bonding with a meat product positioned in contact therewith during cooking of said meat product, then conforming the container about a meat product and cooking the packaged product, whereupon the inner container surface bonds to the meat product to substantially prevent cook-out of fluids therefrom.

Additionally, there is provided a cook-in package comprising a flexible envelope of a multi-layer cook-in film being substantially conformable to a contained meat product and having an inner surface of an ionomer selectively treated with ionizing radiation to a dosage sufficient to cause bonding with a meat product positioned in contact therewith during cooking of said meat product.

Preferably, for said ionomer the olefin is ethylene, the acid is acrylic acid or methacrylic acid, and the irradiation dosage is about 2.5–9 megarads. More preferably, the container is a seamless tubular casing of multilayer film having the structure nylon/adhesive/ionomer (inside), wherein the entire film is irradiated to a dosage of about 2.5–9 megarads, and wherein the adhesive is irradiatively cross-linkable.

DESCRIPTION OF THE PREFERRED EMBODIMENTS

There are several essential features of the invention which enhance the weight yield of a pre-cooked packaged meat product by providing a cook-in package having an inner food contact surface that bonds to the contained meat product during cook-in, thereby preventing cook-out of fluids from the contained meat product. The cook-in package may be made from any of a variety of multi-layer cook-in packaging films so long as the inner surface of the package is an ionomer of a metal salt neutralized copolymer of an olefin, preferably ethylene, and a carboxylic acid, preferably acrylic acid or methacrylic acid. Representatively, such an ionomeric material is commercially available as Surlyn (TM) from the DuPont Company of Wilmington, Del., and is described in detail in U.S. Pat. No. 3,355,319 cited above and hereby incorporated by reference. Secondly, the ionomeric food contact layer must be selectively irradiated which advantageously may be accomplished during irradiation of the overall multi-layer film structure for cook-in integrity, as further discussed below. Thirdly, the package must be loaded with a raw meat product such that the inner food contact surface lies substantially in conforming contact with the contained raw meat product. Thus, the requirement of package conformability refers to packaging configurations that bring the inner surface of the cook-in container substantially uniformly against the surface of the contained meat product so that the bonding surface characteristics of the interior of the container are given an opportunity to function thereby preventing cook-out of fluids during cook-in. There are at least two modes for meeting the requirement that the container be conformable to a selected meat product. For example, tubular casings are conventionally stuffed with a flowable meat product to form a meat log of uniform diameter within the casing. Thus, the container in the form of a fully stuffed casing conforms to the stuffed meat product contained therein. In the case of semi-rigid food products, such as whole poultry, shrink bags are preferably used such that during the initial stages of cooking, the heat shrinkable bag is elevated to its shrink temperature thereby contracting snuggly around the contained product. Fourthly, the packaged product is subjected to cook-in time-temperature conditions for example by immersion in water at 70°–80° C. or in steam for 4–6 hours. The result of meeting the foregoing conditions is that the inner surface of the package bonds to the contained meat product to enhance weight yield of the cooked meat product.

A preferred embodiment of the invention is an irradiated multi-layer seamless tubular food casing having an outer nylon layer over one or more interior layers and having a Surlyn food contact inner surface, for example the structure nylon(outer)/adhesive/surlyn(inner). Conventionally, nylon is present in food casing multi-ply structures to serve as an oxygen barrier to impede the inward diffusion of oxygen and to impart relatively high stuffing strength to the casing. Nylon 6 or 66 is preferred. Generally, the adhesive inter-layer is irradiatively cross-linked for enhanced cook-in structural integrity. In the present example, adhesives are suitable that comprise a chemically modified polyolefin selected from the group consisting of ethylene-vinyl acetate copolymer, high density polyethylene and rubber modified high density polyethylene, each chemically modified by the provision of functional groups which will form a strong bond to nylon under heat and pressure of coextrusion, as representatively shown in U.S. Pat. No. 4,233,367. A preferred adhesive is Plexar (TM) commercially available from the Chemplex Company of Rolling Meadows, Ill. Generally, Plexar adhesive is composed of an acid anhydride grafted polyethylene being irradiatively cross-linkable. Plexar adhesives are described in detail in U.S. Pat. Nos. 4,087,587 and 4,087,588. Plexar 2 adhesive may be characterized as comprising blends of a graft copolymer of a high density polyethylene and at least one unsaturated fused ring carboxylic acid anhydride, blended with one or more resin copolymers of ethylene and an ethylenically unsaturated ester. Plexar 3, most preferred in the present example, comprises blends of a graft copolymer of a high density polyethylene and at least one unsaturated fused ring carboxylic acid anhydride, blended with a polyethylene resin of one or more homopolymers of ethylene, copolymers of ethylene and/or an alpha-olefin.

The tubular casing of the foregoing embodiment can be made by the conventional blown bubble technique whereby tubular multi-layer film is fully coextruded. Representative dimensions for the preferred casing are 4–6 inches outside tubing diameter and a film thickness of 4–6 mils with about 50% of the film thickness being attributable to the nylon layer, about 40% to the Surlyn layer, and about 10% to the adhesive layer. After cooling, the coextruded tube is flattened and then guided through an ionizing radiation field, for example through the beam of an electron accelerator to receive a selected radiation dosage sufficient for cross-linking of the film, preferably in the range of about 2.5–9 megarads (MR). Irradiation by electrons to cross-link the molecules of polymeric material is conventional in the art. Radiation dosages are referred to herein in terms of the radiation unit "rad", with one million rads or a megarad being designated as "MR". Degree of molecular cross-linking is conventionally expressed in terms of the radiation dosage that induces the cross-linking. In general, irradiation should be sufficient to cross-link the irradiatively cross-linkable layers of the film to increase strength of the film without substantially diminishing elongation properties and to provide delamination resistance of the film during cook-in conditions. Following irradiation, the treated tubular film may be accumulated in roll form, for later conversion into casings by severing the tubing at regular intervals and clipping each severed segment at one end.

In use, a casing made in accordance with the invention is uniformly stuffed with flowable meat product and then submerged in a water cooking bath at about 70°–80° C. for about 4–6 hours. The inner surface of the uniformly stuffed casing closely conforms to the contained meat product and, because of the adhering surface characteristics, the inner surface of the casing bonds to the meat product during cook-in thereby retaining fluids in the meat product. After this pre-cooking operation, the meat product may be sold encased in the cook-in casing, or it may be sliced with the casing, or the casing may be stripped from the pre-cooked meat log for further processing.

To further illustrate the function of the present invention, various test casings were evaluated for cooked meat adhesion in a conventional chicken mold operation, wherein the test casings were filled with chicken emulsion and hot water-cooked at 70°–80° C. for about 4.5 hours. Test casings were made of multi-layer film having the general structure Nylon 6/Plexar 3/food contact layer and were irradiated to a dosage of about 9 MR. Food contact layers tested were Surlyn 1650, Surlyn 1601, low density polyethylene, ethylene-vinyl acetate copolymer, and Plexar 3. After cook-in, no binding adhesion of the casings to the contained cooked meat was observed except in the Surlyn test casings which demonstrated excellent binding adhesion. In another type of test casing, the multi-layer structure Nylon 6/Plexar 3/LDPE/Surlyn 1650 was evaluated for the unirradiated condition versus the irradiated condition at dosages of about 2.5 and 5.1 MR. After stuffing and cook-in as above, the unirradiated casing showed no adhesion to the cooked meat contained therein while the irradiated test casings showed excellent binding adhesion to the cooked meat.

As an alternative to the stuffed casing mode, shrink bags may be used to provide conforming contact of the food package with the contained meat product. Thermoplastic shrink bags are conventionally made from oriented blown tubular film in the form of either end-seal or side-seal bags. Representatively, tubular shrink film can be made by a process similar to that described in U.S. Pat. No. 3,741,253 issued on June 26, 1973 to Brax et al which involves film extrusion using the blown film technique, followed by irradiation to enhance orientation properties, and then orientation to impart shrink potential. In use, such bags are loaded with a meat product, vacuumized and heat sealed, and then subjected to cook-in conditions. Thus, upon the loaded shrink bag being introduced into the cooking bath, the bag shrinks snuggly around the contained meat product after several minutes of exposure. A representative multi-layer film structure for shrink bags is EVA/Saran/EVA/Surlyn (inside) where the outside EVA layer is an abuse layer, the Saran layer is an oxygen barrier layer, and the interior EVA layer is a shrink controlling layer, and, as above, the Surlyn food contact layer provides for cook-in binding adhesion. Another respresentative film structure is EVA/Surlyn (inside) where the EVA layer is a shrink controlling layer. In each case, as discussed above, the Surlyn food contact layer must be irradiated in the range previously indicated. This latter nonbarrier example can conveniently be used as a disposable liner in a cooking mold or can to prevent sticking of the meat product to the mold and thereby to improve the visual appeal of the cooked meat product. It is noted that in the shrink barrier bag mode, the Surlyn food contact layer additionally serves as a heat sealing layer during conventional bag making from tubular film.

Although the present invention has been described in conjunction with preferred embodiments, it is to be understood that modifications and variations may be utilized without the departing from the principles and scope of the invention, as those skilled in the art will readily understand. Accordingly, such modifications and variations may be practiced within the scope of the following claims:

What is claimed is:

1. A method for enhancing yield of a cook-in packaged meat product, comprising:
   (a) providing an adhering cook-in container including a flexible thermoplastic envelope being substantially conformable to a contained meat product and having an inner meat contacting surface of an ionomer of a metal salt neutralized copolymer of an olefin and a carboxylic acid, said ionomer, while positioned as the inner surface of a flattened tube, having been treated with ionizing radiation to a dosage sufficient to cause bonding with a meat product positioned in contact therewith during cooking of said meat product;
   (b) conforming said container about a selected meat product; and
   (c) cooking the packaged product, whereupon said inner surface bonds to said meat product to substantially prevent cook-out of fluids therefrom.

2. The method of claim 1 wherein said ionomer is irradiated to a dosage of about 2.5–9 MR and wherein said olefin is ethylene and said acid is acrylic acid or methacrylic acid.

3. The method of claim 2 wherein said container is selected as a seamless tubular casing and said conforming is by stuffing.

4. The method of claim 3 wherein said casing is selected as comprising a tubular multi-layer film structure nylon/adhesive/ionomer, further provided that said adhesive is irradiatively cross-linkable and said film structure is irradiated to said dosage.

5. The method of claim 2 wherein said container is selected as a heat shrinkable bag and said conforming is by container shrinkage upon initiation of said cooking.

6. The method of claim 5 wherein said bag is selected as comprising a tubular multi-layer film structure EVA/ionomer and said film structure is irradiated to said dosage.

7. The method of claim 6 wherein said bag is selected as comprising the multi-layer film structure EVA/Saran/EVA/ionomer.

8. The method of claim 5 wherein said cooking is by immersion in water at about 70°–80° C. or in steam for about 4–6 hours.

* * * * *